US012192119B2

(12) United States Patent
Pulatov et al.

(10) Patent No.: US 12,192,119 B2
(45) Date of Patent: Jan. 7, 2025

(54) APPLICATION PROGRAMMING INTERFACE FOR MULTIPLE NETWORK RESOURCES

(71) Applicant: JPMorgan Chase Bank, N.A., New York, NY (US)

(72) Inventors: Aziz Pulatov, Naperville, IL (US); Saranjit S. Chudha, Naperville, IL (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 18/113,049

(22) Filed: Feb. 23, 2023

(65) Prior Publication Data

US 2024/0291772 A1 Aug. 29, 2024

(51) Int. Cl.
*G06F 15/16* (2006.01)
*G06F 9/54* (2006.01)
*H04L 47/70* (2022.01)

(52) U.S. Cl.
CPC .............. *H04L 47/82* (2013.01); *G06F 9/547* (2013.01)

(58) Field of Classification Search
CPC ................................. H04L 47/82; G06F 9/547
USPC ................... 709/225–226, 203, 250
See application file for complete search history.

(56) References Cited

U.S. PATENT DOCUMENTS

| | | | | |
|---|---|---|---|---|
| 6,594,685 B1* | 7/2003 | Mishra | ..................... | H04L 67/56 709/203 |
| 8,447,829 B1* | 5/2013 | Geller | ..................... | H04L 47/70 709/217 |
| 9,485,323 B1* | 11/2016 | Stickle | ..................... | H04L 67/10 |
| 10,320,662 B1* | 6/2019 | Ahuja | ..................... | H04L 47/70 |
| 2018/0005440 A1* | 1/2018 | Mullins | ..................... | G06F 9/452 |
| 2019/0116108 A1* | 4/2019 | Gibson | ................. | H04L 43/062 |
| 2019/0281112 A1* | 9/2019 | Bhat | ..................... | G06F 9/5027 |
| 2020/0265058 A1* | 8/2020 | Maquaire | ................ | G06F 16/23 |

\* cited by examiner

*Primary Examiner* — Bharat Barot
(74) *Attorney, Agent, or Firm* — Greenblum & Bernstein, P.L.C.

(57) ABSTRACT

A computer-readable medium storing instructions for a universal API (Application Programming Interface) for multiple network resources. The instructions cause a processor to perform receiving, from a user interface, a request associated with a set of different network resources. The request includes one or more operations for the different network resources. The instructions may cause parsing the request to identify each of the operations, and performing the operations on the network resources. The instructions may also cause collecting, from the network resources, responses to the operations that were performed; and generating a consolidated response that includes the responses. The consolidated response may be generated according to a schema defining valid syntax for communications.

18 Claims, 5 Drawing Sheets

APPLICATION PROGRAMMING INTERFACE FOR MULTIPLE NETWORK RESOURCES

BACKGROUND

An application programming interface is a mechanism for two or more computer programs to communicate across a network. An API (Application Programming Interface) can be an interface that allows computer programs to share data across one or more computer systems.

BRIEF DESCRIPTION OF THE DRAWINGS

The drawings illustrate only particular examples of the disclosure and therefore are not to be considered to be limiting of their scope. The principles here are described and explained with additional specificity and detail through the use of the accompanying drawings.

DETAILED DESCRIPTION

Often developers invoke multiple extensive API calls to display a UI (User Interface) layout based on given criteria. This technique leads to delayed response because of the many API calls that are made. The API calls are often made sequentially to many different resources. This technique does lead to longer wait times because end users have to wait for all of the modules to load.

The present disclosure addresses the foregoing by providing an application programming interface (API) that provides a universal interface for communicating with and accessing one or more network resources, such as databases, services, microservices, applications, etc. The universal API allows user interfaces to communicate with multiple network resources using a single syntax, even if the network resources utilize different languages and data formats. Additionally, the universal API uses a single request to obtain some or all of the UI data from one or multiple network resources. Moreover, the universal API allows new operations and data types to be added to the request syntax without altering the one or more network resources.

As such, the present disclosure provides an API that offers a flexible payload that can be molded based on a particular use case or environment. Moreover, the API allows a minimum number of requests to build a robust user interface layout. Further, the new features can be implemented and accessed on the API with minimal effort and downtime.

Figure 1:
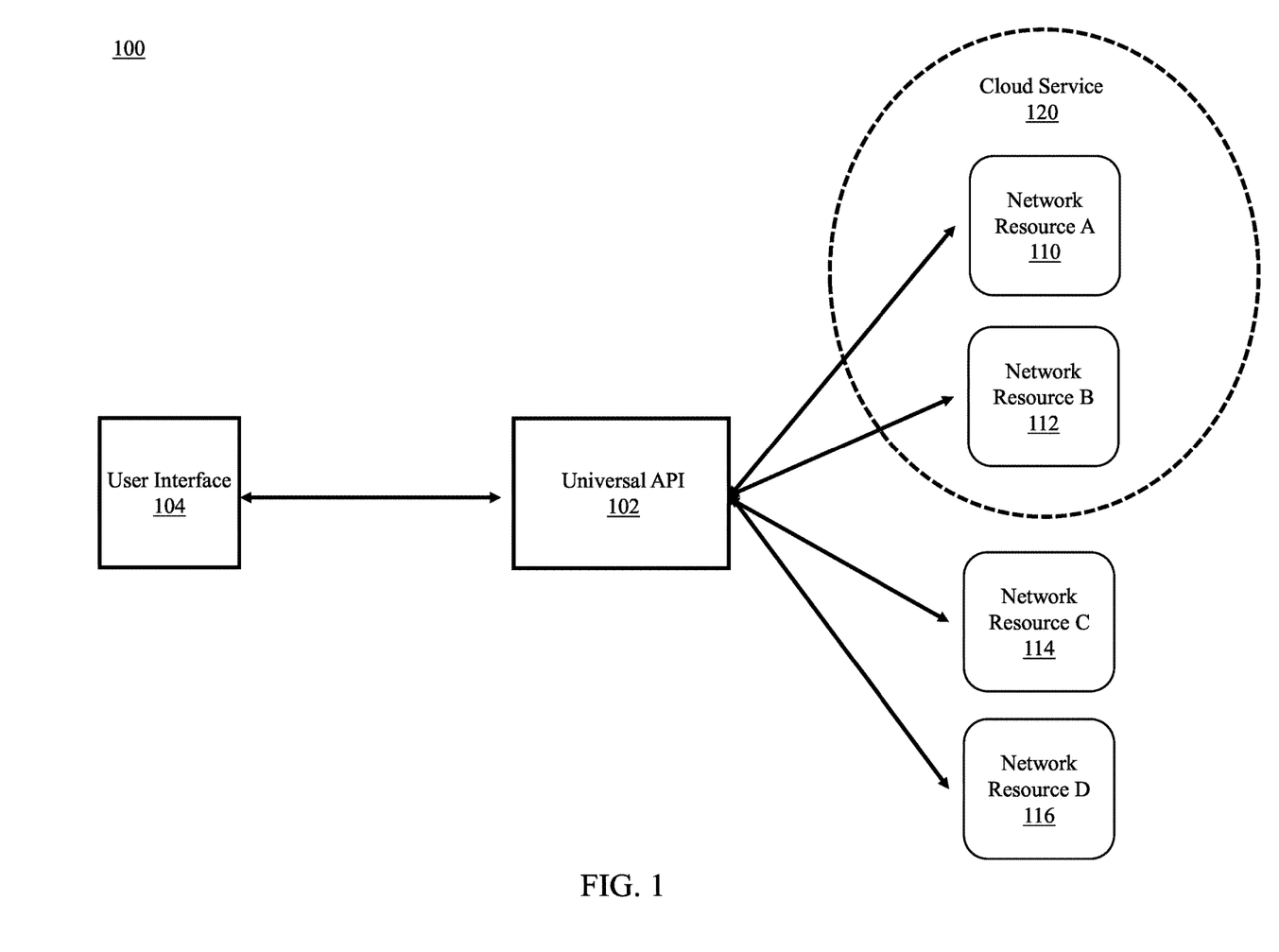
FIG. 1 illustrates a network environment including a universal application programming interface according to examples of the present disclosure.

FIG. 1 illustrates a network environment 100 to provide a universal interface to network resources and other computing services according to examples of the present disclosure. While FIG. 1 illustrates various components contained in the network environment 100, FIG. 1 illustrates one example of a network environment of the present disclosure, and additional components can be added and existing components can be removed.

In the example of FIG. 1, the network environment 100 includes a universal API 102 that provides an interface for a user interface (UI) 104 to one or more network resources, e.g., network resource A 110, network resource B 112, network resource C 114, and network resource D 116. The network resources represent data, services, etc. that can be accessed by the UI 104. For example, the network resources can include databases, software applications, software services, microservices, and the like. The network resources can be programmed, formatted, and communicate using different programming languages. For example, the network resources can include resources for financial and merchant services, for example. The resources may be spread across multiple databases.

One or more of the network resources can be part of and/or hosted by a cloud service 120. The cloud service 120 can be a public cloud service, a private cloud service, or a hybrid (public/private) cloud service. For example, the cloud service 120 can be a public cloud such as AWS™ to provide cloud services to subscribers and customers. While the network environment 100 is illustrated as including one cloud service 120, the network environment 100 can include additional cloud services, and the arrangement and components of such a cloud computing environment can vary.

As used herein, a "cloud" or "cloud service" can include a collection of computer resources that can be invoked to instantiate a virtual machine, application instance, process, data storage, or other resources for a limited or defined duration. The collection of resources supporting a cloud can include a set of computer hardware and software to deliver computing components needed to instantiate a virtual machine, application instance, process, data storage, or other resources. For example, one group of computer hardware and software can host and serve an operating system or components thereof to deliver to and instantiate a virtual machine. Other types of computer hardware and software are possible.

The universal API 102, the UI 104, and the network resources, e.g., the network resource A 110, the network resource B 112, the network resource C 114, and the network resource D 116, can communicate via one or more networks. The one or more networks can include public networks, private networks, and combinations thereof.

Figure 2:
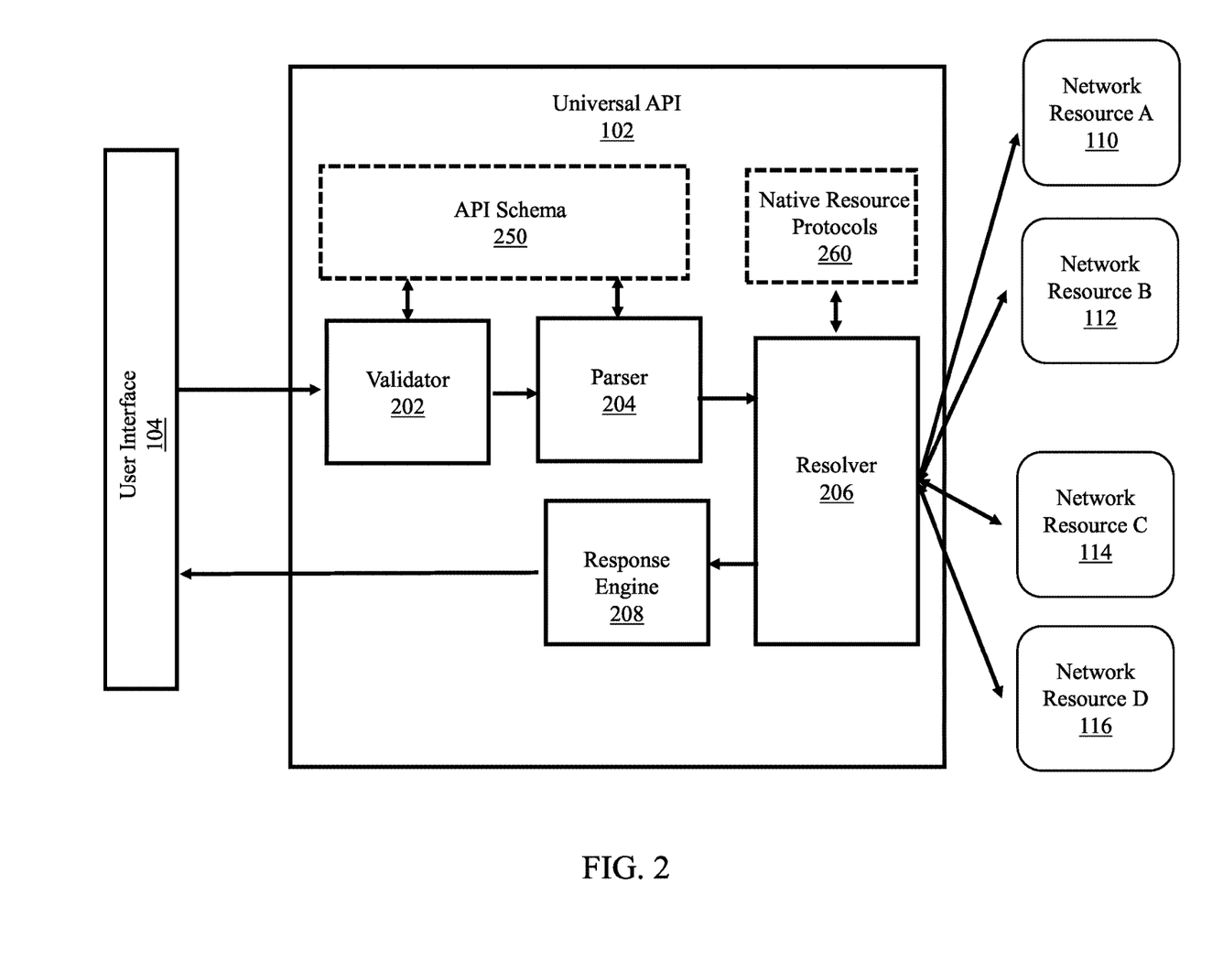
FIG. 2 is a block diagram illustrating a universal application programming interface according to an example of the present disclosure.

FIG. 2 is a block diagram of components of the universal API 102 according to an example of the present disclosure. While FIG. 2 illustrates various components contained in the universal API 102, FIG. 2 illustrates one example of a universal API of the present disclosure, and additional components can be added and existing components can be removed.

In FIG. 2, the universal API 102 can be implemented as a software program or software application containing modules or components to perform the API functionality as described herein. The universal API 102 can be written in any type of conventional programming languages such as C, C++, JAVA®, Perl®, and the like. In one example, the universal API 102 can be written in GraphQL® programming language.

The universal API 102 includes a validator 202, a parser 204, a resolver 206, and a response engine 208. Although illustrated as components of the universal API 102 in FIG. 2, the validator 202, the parser 204, the resolver 206, and the response engine 208 can be implemented as standalone components that communicate with the universal API 102.

The validator 202 receives requests from the UI 104 and determines if the requests are valid. To determine if the requests are valid, the validator 202 compares the requests to an API schema 250 of the universal API 102.

The API schema 250 defines a valid syntax for communication and a format of requests that can be made to the universal API 102, and may incorporate components of a GraphQL® language, for example. In some examples, the API schema 250 defines query and manipulation language for extracting data from and modifying data on the network resource A 110, the network resource B 112, the network resource C 114, and the network resource D 116. As shown, the network resource A 110, the network resource B 112, the network resource C 114, and the network resource D 116 are different types of networks, thus, API schema 250 is operable with different network resources that are structured using different types of programming languages and formats. The API schema 250 may also consolidate multiple requests to one or more of the network resources into a single request.

The API schema 250 defines a universal syntax that specifies types of requests, operations to be performed, and data to be accessed. The API schema 250 defines the types of operation, such as a query (extracts data) and a mutation (changes data), and data fields on which the operations act, that are available to the UI 104, which can then request less than or all of the available data.

In one example, the API schema 250 is designed and implemented for financial services. The API schema 250 may relate to a set of network resources supporting Merchant Services transactions used by financial institutions, retailers, wholesalers, etc. The API schema 250 defines the data structure in a manner that facilitates the query and mutation for financial services. In this example, the API can define a model for operations and data fields that allow the UI 104 to communicate with the network resources, e.g., the network resource A 110, the network resource B 112, the network resource C 114, and the network resource D 116. In this particular example, the model can be structured as:

```
Example Model
retrieveContact
  ContactDetail.java
  ContactSearchInfo.java
  ContactSearchResponse.java
  RetrieveContactInfo.java
    @Getter
    @Setter
    public class RetriveContactInfo {
      private String serviceName;
      private String contextId;
      private Long requestTime;
      private Long responseTime;
      private Integer timeTaken;
      private ContactSearchResponse;
    }
  RetrieveContactInfoRequest.java
retrieveFundingInstruction
  RetrieveFundingInstuction.java
  RetrieveFundingInstructionResponse.java
  SettlementInstruction.java
retrievePricingInstruction
  RetrievePricingInstruction.java
retrieveProcessingEntity
  RetrieveProcessingEntity.java
retrieveProfile
  Request
  Response
retrieveMethodOfPayment
  RetrieveMethodOfPayment.java
```

Here, the API schema 250 is structured in a logical manner that facilitates merchant processing services. A financial services user that wishes to obtain transaction information for a client may retrieve contact details, retrieve funding instructions for the transaction, retrieve pricing information, retrieve processing entity, retrieve a profile and method of payment. Each transaction information may be an object with the transaction information details, and the object may include additional objects as shown above. Here, the RetrieveContactInfo.java object includes information for serviceName, contextId, requestTime, responseTime, timeTaken and the object ContactSearchResponse. The financial services user may be presented with all information (based on a single API request) or less information all presented in a logical/hierarchical manner (e.g., contact information before funding instruction information). Moreover, the API schema 250 facilitates consistency by employing transaction information that can used across all financially-related industries.

Additionally, for example, the API schema 250 can define a data field and an operation can be performed as illustrated in the following pseudo code:

```
Data fields
  type ContactInfo {
    ServiceName: String
    ContextID: String
  }
Operation
  public Class RetrieveContactInfo{
    private String serviceName;
    private String contextID;
    private Long requestTime;
    private Long reponseTime;
    private Integer timeTaken;
    private ContactSearchResponse contactSearchResonse;
  }
```

When the validator 202 receives a request from UI 104, the validator 202 compares the request to the API schema 250 and determines if the request conforms to the API schema 250. If the request is valid, the parser 204 parses the requests to identify the operations and data affected by the request using the API schema 250. As used herein, parse or parsing refers to the breakup of received inputs into constituent parts such as objects, methods and their attributes or options or to identify specific code.

Once parsed, the resolver 206 communicates with the network resources, e.g., the network resource A 110, the network resource B 112, the network resource C 114, and the network resource D 116, to perform the requests. For example, the API schema 250 can include an operation and data map that associates each operation and data field with a target network resource, e.g., one or more of the network resource A 110, the network resource B 112, the network resource C 114, and the network resource D 116. In this manner, the API schema 250 identifies the targeted network resources and the corresponding routing, avoiding the need to utilize specific single requests for each resource. Moreover, the API schema 250 also permits the use of operations, e.g., query, to specify multiple resources.

Based on the target network resource associated with the operations, the resolver 206 can access a native resource protocol 260. The native resource protocol 260 can include the format, syntax, etc. to communicate with the network resources. Using the native resource protocol 260, the resolver 260 can determine how to communicate with the network resources, e.g., one or more of the network resource A 110, the network resource B 112, the network resource C 114, and the network resource D 116, to perform the operations that were parsed by the parser 204.

For example, the universal API 102 can receive a request that queries (operation) data located on the network resource B 112 and the network resource D 116. When the resolver 206 receives the parsed request, the resolver 206 can access the native resource protocol 260 to determine the protocol for querying data from the network resource B 112 and the network resource D 116. Once determined, the resolver 206 can perform, using the native protocols, the query on the network resource B 112 and the network resource D 116. As such, the universal API 102 allows multiple queries to multiple network resources to be received in a single request.

The resolver 206 can include the logic to communicate, using the native protocols and syntax, directly with the network resources, e.g., the network resource A 110, the network resource B 112, the network resource C 114, and the network resource D 116, using the language and format of the network resources. The resolver 206 can also include the necessary logic to communicate with native APIs of the network resources, e.g., the network resource A 110, the network resource B 112, the network resource C 114, and the network resource D 116.

The resolver 206 may also receive responses from any of the network resources, e.g., the network resource A 110, the network resource B 112, the network resource C 114, and the network resource D 116, on which an operation is performed.

The resolver 206 passes the responses to the response engine 208. The response engine 208 consolidates the responses into a single response according to the API schema 250. The response engine 208 then returns the consolidated response to the UI 104 as a response to the original request. Note that the consolidated response is based on the resolver 206 using the native resources protocols 260 to receive each response in its native protocol and syntax, which can then be converted to the valid syntax of API schema 250.

Accordingly, the universal API 102, using the API schema 250, allows UI 104 to communicate with the network resource A 110, the network resource B 112, the network resource C 114, and the network resource D 116 using a single syntax, even if the network resource A 110, the network resource B 112, the network resource C 114, and the network resource D 116 utilize different syntax, languages, and data formats. Additionally, the universal API allows multiple requests to be made to the network resource A 110, the network resource B 112, the network resource C 114, and the network resource D 116 using a single request that defines one or more operations and data affected. Moreover, because the API schema 250 is abstracted from the native protocols of the network resource A 110, the network resource B 112, the network resource C 114, and the network resource D 116, the universal API 102 allows new operations and data types to be added to the API schema 250 without altering the network resource A 110, the network resource B 112, the network resource C 114. Similarly, the API schema 250 can be adapted if the network resource A 110, the network resource B 112, the network resource C 114 are altered or additionally network resources are added.

Here, note that the universal API 102 can be implemented as a portion of other software programs or applications. The universal API 102 can include the necessary logic, commands, instructions, and protocols to perform the processes and methods described herein. The universal API 102 can be executed on one or more computing systems or devices as described below. The computing systems or devices can be one more of any type of computing system capable of executing the universal API 102, such as servers, desktops, the cloud service 120, and the like. The computing system and devices can include several hardware resources, which are used to execute the universal API 102 such as processors, memory, network hardware and bandwidth, storage devices, etc., and a number of software resources, such as operating systems, application programs, software appliances, etc. The universal API 102 can be stored in computer-readable storage devices or media (CD, DVD, hard drive, portable storage memory, etc.) whether local to the computing system and devices or remotely located.

Figure 3:
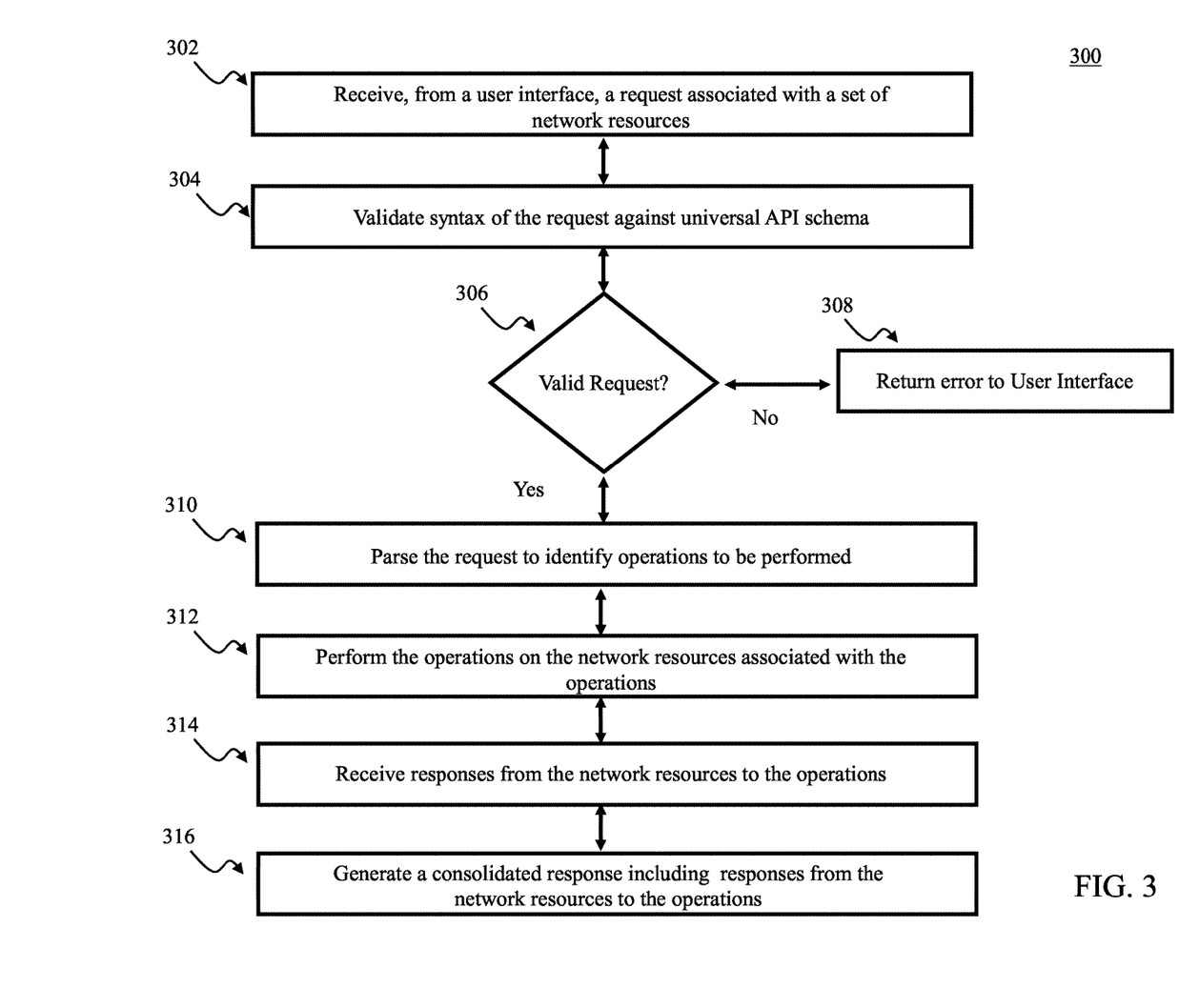
FIG. 3 is a flow diagram illustrating a method for universal access to network resources according to an example of the present disclosure.

FIG. 3 is a flow diagram for a method 300 for providing access to network resources according to an example of the present disclosure. While FIG. 3 illustrates various stages that can be performed, any of the stages can be removed and/or reorder, and additional stages can be added.

In 302, a request is received from a user interface that is associated with a set of network resources. For example, a UI 104 can request to perform one or more operations associated with multiple network resources, e.g., the network resource A 110, the network resource B 112, the network resource C 114, and the network resource D 116.

In 304, the request is validated against a universal application programming interface schema. For example, the universal API 102 can validate the request against the API schema 250. The universal API 102 can examine the syntax and format to determine if it conforms with the API schema 250. The API schema 250 is configured as a universal syntax that defines types of requests, operations to be performed, and data to be accessed, not on the programming of the network resources, e.g., the network resource A 110, the network resource B 112, the network resource C 114, and the network resource D 116. The API schema 250 can define types of operation, such as a query (extracts data) and a mutation (changes data), and data fields on which the operations act.

In 306, if the request is invalid, an error message is sent, in 308. In 310, if the request is valid, the request is parsed to identify operations to be performed. For example, the universal API 102 can parse the requests to identify the operations and data affected by the request using the API schema 250. For instance, the request may include a data query that requires data from the network resource A 110 and network resource D 116. The universal API can parse the request to identify that the network resource A 110 and network resource D 116 should be queried.

In 312, the operations are performed on the network resources associated with the operations. For example, the universal API 102 can perform the operations on the identified network resources of the request. In the above example, the universal API 102 can query the network resource A 110 and network resource D 116. The universal API 102 can communicate with the network resource A 110 and network resource D 116 according to the format and language of the network resource A 110 and network resource D 116.

In 314, responses to the operations are received from the network resources. In the above example, the universal API 102 can receive responses from the network resource A 110 and network resource D 116. For instance, the universal API can receive data from both the network resource A 110 and network resource D 116.

In 316, a consolidated response is generated that includes responses from the network resources to the operations. For example, the universal API 102 combines the data from the network resource A 110 and network resource D 116 into a single response according to the API schema 250. The consolidated response can then be forwarded to the UI 104.

Figure 4:
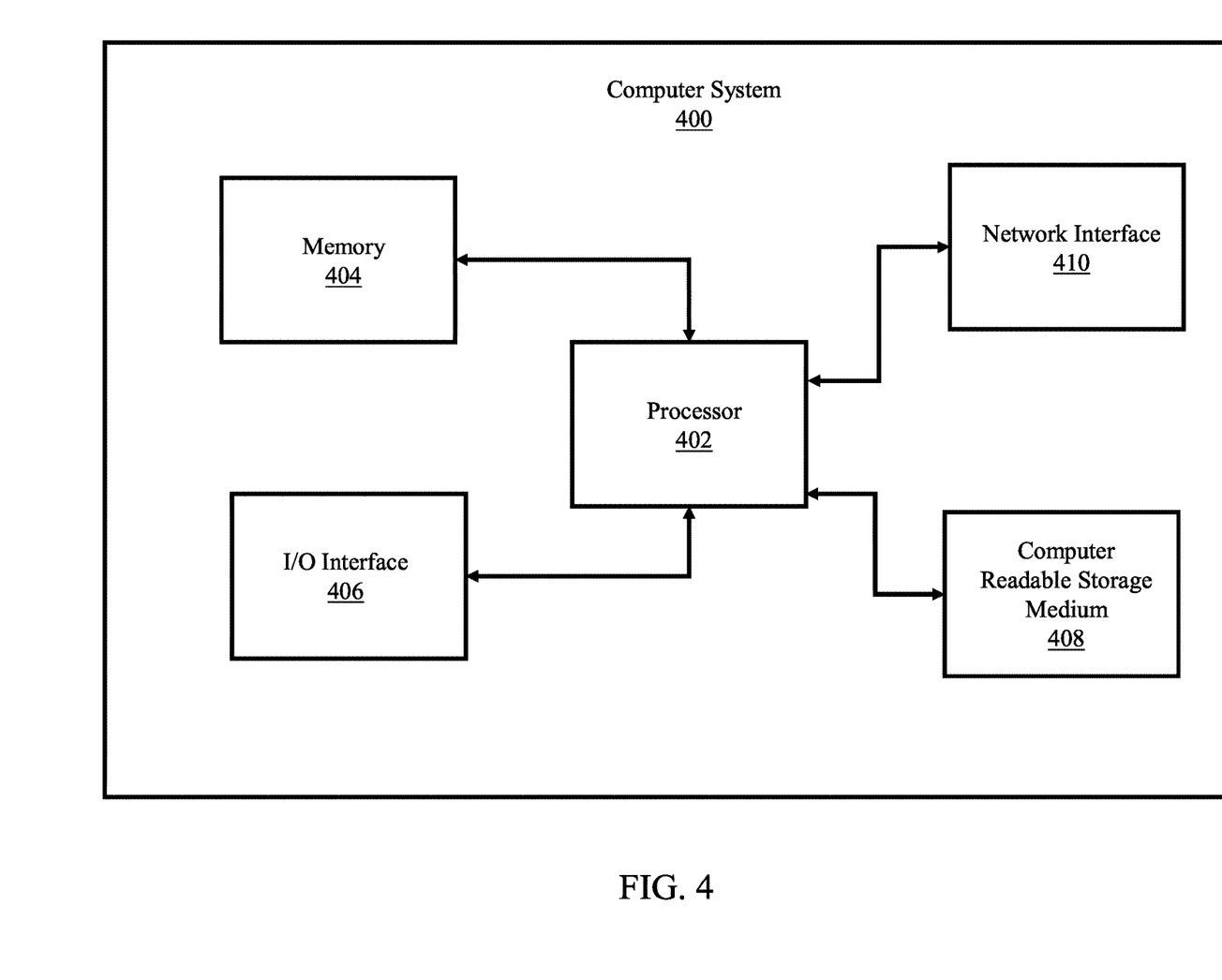
FIG. 4 is a block diagram illustrating a computer system according to an example of the present disclosure.

FIG. 4 is a block diagram of an example computer system 400 according to an example of the present disclosure. For example, the computer system 400 can be used to implement the universal API 102 of FIGS. 1 and 2 and/or the network resources, as well as to provide computing resources as described herein. In some implementations, the computer system 400 can include one or more processors 402, one or more memories 404, one or more input/output (I/O) interfaces 406, computer-readable storage media 408, and one or more network interfaces 410. In various implementations, the processor 402 can be used to implement various functions and features described herein, as well as to perform the method implementations described herein. The processor 402 can be and/or include a processor, a microprocessor, a computer processing unit (CPU), a graphics processing unit (GPU), a neural processing unit, a physics processing unit, a digital signal processor, an image signal processor, a synergistic processing element, a field-programmable gate array (FPGA), a sound chip, a multi-core processor, and so forth. As used herein, "processor," "processing component," "processing device," and/or "processing unit" can be used generically to refer to any or all of the aforementioned specific devices, elements, and/or features of the processing device. While the processor 402 is described as performing implementations described herein, any suitable component or combination of components of the computer system 400 or any suitable processor or processors associated with the computer system 400 or any suitable system can perform the steps.

The non-transitory computer-readable storage medium 408 can be any electronic, magnetic, optical, or other physical storage device that stores executable instructions. For example, the non-transitory computer-readable storage medium 608 can be random access memory (RAM), an electrically-erasable programmable read-only memory (EEPROM), a storage drive, an optical disc, or the like. The non-transitory computer-readable storage medium 408 can be encoded to store executable instructions that cause a processor to perform operations according to examples of the disclosure.

The network interface 410 can be configured to communicate with one or more network via one or more communication links. Communication links can be direct or indirect. A direct link can include a link between two devices where information is communicated from one device to the other without passing through an intermediary. For example, the direct link can include a Bluetooth® connection, a WI-FI® Direct connection, a near-field communications (NFC) connection, an infrared connection, a wired universal serial bus (USB) connection, an ethernet cable connection, a fiber-optic connection, a firewire connection, a microwire connection, and so forth. In another example, the direct link can include a cable on a bus network. "Direct," when used regarding the communication links, can refer to any of the aforementioned direct communication links.

An indirect link can include a link between two or more devices where data may pass through an intermediary, such as a router, before being received by an intended recipient of the data. For example, the indirect link can include a wireless fidelity (WiFi) connection where data is passed through a WiFi router, a cellular network connection where data is passed through a cellular network router, a wired network connection where devices are interconnected through hubs and/or routers, and so forth. The cellular network connection can be implemented according to one or more cellular network standards, including the global system for mobile communications (GSM) standard, a code division multiple access (CDMA) standard such as the universal mobile telecommunications standard, an orthogonal frequency division multiple access (OFDMA) standard such as the long term evolution (LTE) standard, and so forth. "Indirect," when used regarding the communication links can refer to any of the aforementioned indirect communication links.

Figure 5:
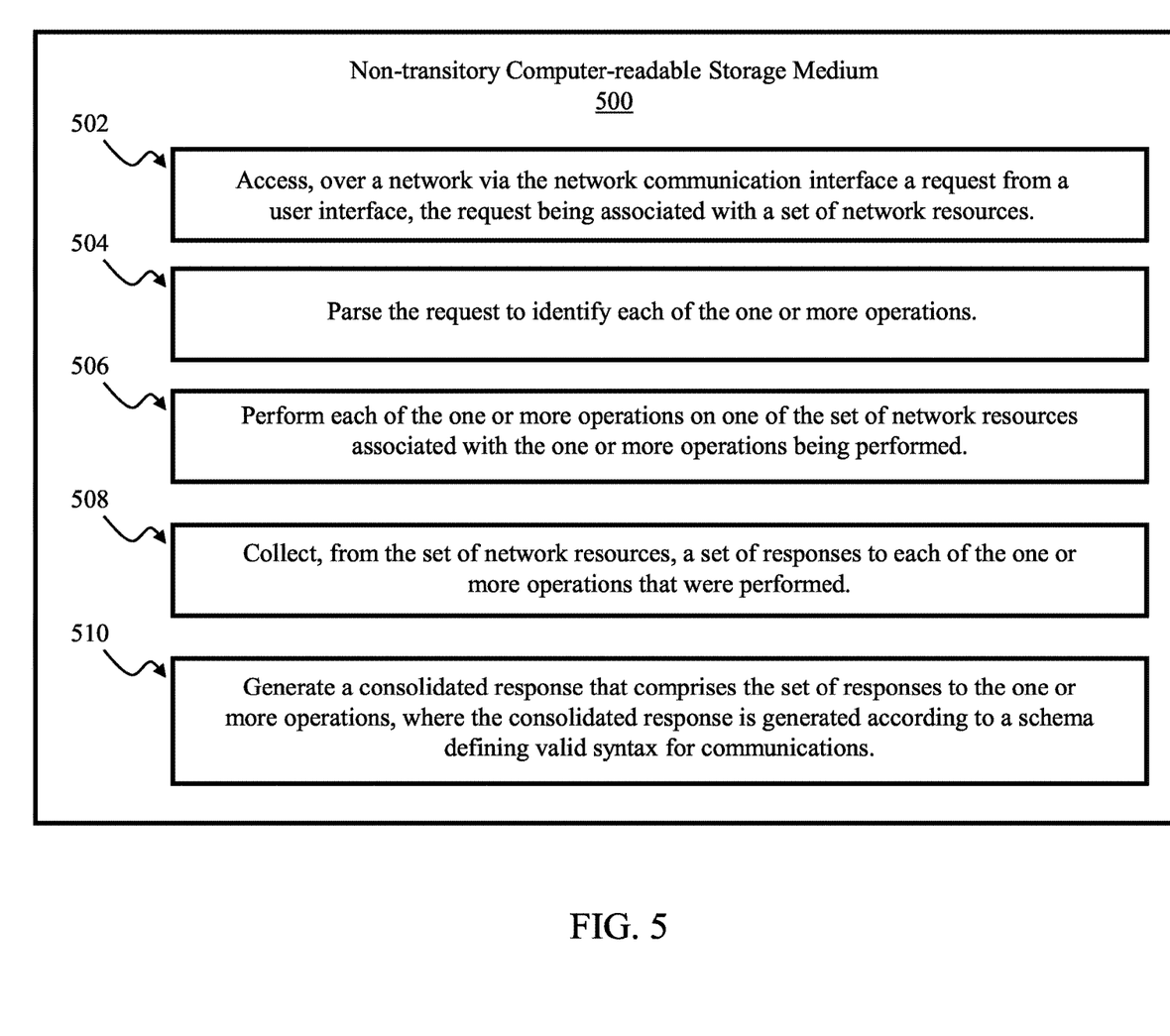
FIG. 5 illustrates example instructions stored on a non-transitory computer-readable storage medium according to an example of the present disclosure.

FIG. 5 illustrates example instructions stored on a non-transitory computer-readable storage medium 500, which can be used in the computer systems of the present disclosure, according to one example of the present disclosure.

As shown in FIG. 5, the non-transitory computer-readable storage medium 500 includes instruction 502, instruction 504, instruction 706 and instruction 708.

Instruction 502 can cause one or more processors, e.g., processor 402, to access, over a network via a network communication interface, e.g., the network interface 410 a request from a user interface, e.g., the UI 104, the request being associated with a set of network resources, e.g., the network resource A 110, the network resource B 112, the network resource C 114, and the network resource D 116. The request can include one or more operations for at least two different types of network resources in the set of network resources.

Instruction 504 can cause one or more processors, e.g., processor 402, to parse the request to identify each of the one or more operations.

Instruction 506 can cause one or more processors, e.g., processor 402, to perform each of the one or more operations on one of the set of network resources, e.g., the network resource A 110, the network resource B 112, the network resource C 114, and the network resource D 116, associated with the one or more operations being performed.

Instruction 508 can cause one or more processors, e.g., processor 402, to collect, from the set of network resources, e.g., the network resource A 110, the network resource B 112, the network resource C 114, and the network resource D 116, a set of responses to each of the one or more operations that were performed.

Instruction 510 can cause one or more processors, e.g., processor 402, to generate a consolidated response that comprises the set of responses to the one or more operations. The consolidated response is generated according to a schema, e.g., the API Schema 250, defining valid syntax for communications.

The present disclosure may employ a software stack to enlist the underlying tools, frameworks, and libraries used to build and run example applications of the present disclosure. Such a software stack may include PHP, React, Cassandra™, Hadoop®, Swift, etc. The software stack may include both frontend and backend technologies including programming languages, web frameworks servers, and operating systems. The frontend may include JavaScript®, HTML, CSS, and UI frameworks and libraries. In one example, a MEAN (MongoDB®, Express.js, Angular JS, and Node.js) stack may be employed. In another example, a LAMP (Linux®, Apache®, MySQL®, and PHP) stack may be utilized.

Any suitable programming language can be used to implement the routines of particular examples including Java®, Python®, JavaScript®, C, C++, assembly language, etc. Different programming techniques can be employed such as procedural or object oriented. The routines may execute on specialized processors.

The specialized processor may include memory to store a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a software program.

As used in the description herein and throughout the claims that follow, "a", "an", and "the" include plural references unless the context clearly dictates otherwise. Also, as used in the description herein and throughout the claims that follow, the meaning of "in" includes "in" and "on" unless the context clearly dictates otherwise. While the above is a complete description of specific examples of the disclosure, additional examples are also possible. Thus, the above description should not be taken as limiting the scope of the disclosure which is defined by the appended claims along with their full scope of equivalents.

The foregoing disclosure encompasses multiple distinct examples with independent utility. While these examples have been disclosed in a particular form, the specific examples disclosed and illustrated above are not to be considered in a limiting sense as numerous variations are possible. The subject matter disclosed herein includes novel and non-obvious combinations and sub-combinations of the various elements, features, functions and/or properties disclosed above both explicitly and inherently. Where the disclosure or subsequently filed claims recite "a" element, "a first" element, or any such equivalent term, the disclosure or claims is to be understood to incorporate one or more such elements, neither requiring nor excluding two or more of such elements. As used herein regarding a list, "and" forms a group inclusive of all the listed elements. For example, an example described as including A, B, C, and D is an example that includes A, includes B, includes C, and also includes D. As used herein regarding a list, "or" forms a list of elements, any of which may be included. For example, an example described as including A, B, C, or D is an example that includes any of the elements A, B, C, and D. Unless otherwise stated, an example including a list of alternatively-inclusive elements does not preclude other examples that include various combinations of some or all of the alternatively-inclusive elements. An example described using a list of alternatively-inclusive elements includes at least one element of the listed elements. However, an example described using a list of alternatively-inclusive elements does not preclude another example that includes all of the listed elements. And, an example described using a list of alternatively-inclusive elements does not preclude another example that includes a combination of some of the listed elements. As used herein regarding a list, "and/or" forms a list of elements inclusive alone or in any combination. For example, an example described as including A, B, C, and/or D is an example that may include: A alone; A and B; A, B and C; A, B, C, and D; and so forth. The bounds of an "and/or" list are defined by the complete set of combinations and permutations for the list.

The invention claimed is:

1. A server system comprising a processor, and a computer-readable storage medium accessible to the processor and storing instructions that, when executed by the processor, causes the processor to:

provide a universal application programming interface (U-API) having a universal syntax to enable provision of a user interface (UI);

receive, at the processor, via the U-API and from the UI, a request in the universal syntax to perform an operation with a first network resource and with a second network resource, wherein the operation comprises a query operation that accesses data associated with financial services of the first network resource and the second network resource and a mutation operation that alters data associated with financial services of the first network resource and the second network resource;

parse the received request to identify the operation;

generate a first request in a first syntax to perform the operation with the first network resource, wherein the first syntax differs from the universal syntax;

generate a second request in a second syntax to perform the operation with the second network resource, wherein the second syntax differs from the universal syntax and differs from the first syntax;

transmit the first request, via a network, to a first remote device that provides the first network resource;

transmit the second request, via the network, to a second remote device that provides the second network resource;

receive, via the network and from the first remote device, a first response in the first syntax to the first request that is indicative of a first result of performing the operation with the first network resource;

receive, via the network and from the second remote device, a second response in the second syntax to the second request that is indicative of a second result of performing the operation with the second network resource;

convert the first response into the universal syntax from the first syntax;

convert the second response into the universal syntax from the second syntax;

consolidate the converted first response and the converted second response into a single consolidated response in the universal syntax; and provide the single consolidated response to the UI via the U-API.

2. The server system of claim 1, wherein the processor is caused to validate the received request against an API schema that defines valid requests in the universal syntax of the U-API.

3. The server system of claim 2, wherein the API schema comprises a data field with a contact information data type and an operation with a public class function that includes a plurality of private data.

4. The server system of claim 1, wherein:
the first syntax is associated with a first API of the first network resource; and
the second syntax is associated with a second API of the second network resource.

5. The server system of claim 1, wherein at least one of the first network resource and the second network resource comprises at least one of:
a database;
a micro-network service;
a third-party API; or a cloud service API.

6. The server system of claim 5, wherein at least one of the first network resource and the second network resource is associated with electronic financial transaction backend resources.

7. A non-transitory computer-readable storage medium storing instructions that, when executed by a processor, causes the processor to:
provide a universal application programming interface (U-API) having a universal syntax to enable provision of a user interface (UI);
receive, at the processor, via the U-API and from the UI, a request in the universal syntax to perform an operation with a first network resource and with a second network resource, wherein the operation comprises a query operation that accesses data associated with financial services of the first network resource and the second network resource and a mutation operation that alters data associated with financial services of the first network resource and the second network resource;
parse the received request to identify the operation;
generate a first request in a first syntax to perform the operation with the first network resource, wherein the first syntax differs from the universal syntax;
generate a second request in a second syntax to perform the operation with the second network resource, wherein the second syntax differs from the universal syntax and differs from the first syntax;
transmit the first request, via a network, to a first remote device that provides the first network resource;
transmit the second request, via the network, to a second remote device that provides the second network resource;
receive, via the network and from the first remote device, a first response in the first syntax to the first request that is indicative of a first result of performing the operation with the first network resource;
receive, via the network and from the second remote device, a second response in the second syntax to the second request that is indicative of a second result of performing the operation with the second network resource;
convert the first response into the universal syntax from the first syntax;
convert the second response into the universal syntax from the second syntax;
consolidate the converted first response and the converted second response into a single consolidated response in the universal syntax; and
provide the single consolidated response to the UI via the U-API.

8. The non-transitory computer readable storage medium of claim 7, wherein the processor is caused to validate the received request against an API schema that defines valid requests in the universal syntax of the U-API.

9. The non-transitory computer readable storage medium of claim 8, wherein the API schema comprises a data field with a contact information data type and an operation with a public class function that includes a plurality of private data.

10. The non-transitory computer readable storage medium of claim 7, wherein:
the first syntax is associated with a first API of the first network resource; and
the second syntax is associated with a second API of the second network resource.

11. The non-transitory computer readable storage medium of claim 7, wherein at least one of the first network resource and the second network resource comprises at least one of:
a database;
a micro-network service;
a third-party API; or
a cloud service API.

12. The non-transitory computer readable storage medium of claim 11, wherein at least one of the first network resource and the second network resource is associated with electronic financial transaction backend resources.

13. A computer-implemented method comprising:
providing, by at least one processor, a universal application programming interface (U-API) having a universal syntax to enable provision of a user interface (UI);
receiving, at the at least one processor, via the U-API and from the UI, a request in the universal syntax to perform an operation with a first network resource and with a second network resource, wherein the operation comprises a query operation that accesses data associated with financial services of the first network resource and the second network resource and a mutation operation that alters data associated with financial services of the first network resource and the second network resource;
parsing the received request to identify the operation;
generating, by the at least one processor, a first request in a first syntax to perform the operation with the first network resource, wherein the first syntax differs from the universal syntax;
generating, by the at least one processor, a second request in a second syntax to perform the operation with the second network resource, wherein the second syntax differs from the universal syntax and differs from the first syntax;
transmitting the first request, via a network, to a first remote device that provides the first network resource;
transmitting the second request, via the network, to a second remote device that provides the second network resource;
receiving, via the network and from the first remote device, a first response in the first syntax to the first request that is indicative of a first result of performing the operation with the first network resource;
receiving, via the network and from the second remote device, a second response in the second syntax to the second request that is indicative of a second result of performing the operation with the second network resource;
converting, by the at least one processor, the first response into the universal syntax from the first syntax;
converting, by the at least one processor, the second response into the universal syntax from the second syntax;
consolidating, by the at least one processor, the converted first response and the converted second response into a single consolidated response in the universal syntax; and
providing the single consolidated response to the UI via the U-API.

14. The computer-implemented method of claim 13, further comprising validating the received request against an API schema that defines valid requests in the universal syntax of the U-API.

15. The computer-implemented method of claim 14, wherein the API schema comprises a data field with a contact information data type and an operation with a public class function that includes a plurality of private data.

16. The computer-implemented method of claim 13, wherein:
the first syntax is associated with a first API of the first network resource; and the second syntax is associated with a second API of the second network resource.

17. The computer-implemented method of claim 13, wherein at least one of the first network resource and the second network resource comprises at least one of:
   a database;
   a micro-network service;
   a third-party API; or a cloud service API.

18. The computer-implemented method of claim 17, wherein at least one of the first network resource and the second network resource is associated with electronic financial transaction backend resources.

\* \* \* \* \*